United States Patent
Lu et al.

(10) Patent No.: US 12,359,785 B2
(45) Date of Patent: Jul. 15, 2025

(54) OLED LAMP PANEL WITH DISPLAY PERIPHERAL REGIONS AND DISPLAY REGION OF REGULAR SHAPE FORMED BY PLURALITY OF LIGHT EMITTING UNITS OF THE SAME SHAPE, AND LIGHTING DEVICE HAVING THE SAME

(71) Applicant: GU'AN YEOLIGHT TECHNOLOGY CO., LTD., Langfang (CN)

(72) Inventors: Tianxing Lu, Gu'an County (CN); Guohui Zhang, Gu'an County (CN); Xianbin Xu, Gu'an County (CN); Yingguang Zhu, Gu'an County (CN); Qianqian Yu, Gu'an County (CN); Jianxi Kang, Gu'an County (CN); Jing Wang, Gu'an County (CN); Jing Xie, Gu'an County (CN); Yonglan Hu, Gu'an County (CN); Yanbo Dong, Gu'an County (CN)

(73) Assignee: GU'AN YEOLIGHT TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 18/283,938

(22) PCT Filed: Apr. 6, 2022

(86) PCT No.: PCT/CN2022/085345
§ 371 (c)(1),
(2) Date: Sep. 25, 2023

(87) PCT Pub. No.: WO2022/213990
PCT Pub. Date: Oct. 13, 2022

(65) Prior Publication Data
US 2024/0159370 A1  May 16, 2024

(30) Foreign Application Priority Data
Apr. 7, 2021 (CN) .......................... 202110372084.1

(51) Int. Cl.
*F21S 41/155* (2018.01)
*F21S 43/145* (2018.01)
(Continued)

(52) U.S. Cl.
CPC ........... *F21S 41/155* (2018.01); *F21S 43/145* (2018.01); *F21Y 2105/10* (2016.08); *F21Y 2115/15* (2016.08)

(58) Field of Classification Search
CPC ...... G09F 9/302; G09F 9/3023; F21S 43/239; F21S 43/245; F21S 41/145; F21S 41/155; F21Y 2115/15; F21Y 2105/12–18
See application file for complete search history.

(56) References Cited

U.S. PATENT DOCUMENTS 9,666,756 B2 *  5/2017  von Malm ............ F21S 41/151
10,141,378 B2   11/2018  Lin et al.
(Continued)

FOREIGN PATENT DOCUMENTS

| CN | 103629613 A | 3/2014 |
| CN | 205640625 U | 10/2016 |

(Continued)

OTHER PUBLICATIONS

Machine translation of CN110265464A, retrieved from worldwide.espacenet.com on Aug. 20, 2024 (Year: 2024).*
(Continued)

*Primary Examiner* — Abdulmajeed Aziz
*Assistant Examiner* — Steven Y Horikoshi
(74) *Attorney, Agent, or Firm* — McCarter & English, LLP

(57) ABSTRACT

Provided are an organic light-emitting diode (OLED) lamp panel and a lighting device. A display region of the lamp panel includes at least one main display region and a display peripheral region. The main display region is regular in
(Continued)

shape and is formed by splicing multiple main light-emitting units of the same shape. The display peripheral region consists of a peripheral region I and/or a peripheral region II. The peripheral region I is formed by multiple first peripheral light-emitting units with regular shapes. The display region of the OLED lamp panel is designed to include at least one main display region and a display peripheral region.

11 Claims, 14 Drawing Sheets

(51) Int. Cl.
*F21Y 105/10* (2016.01)
*F21Y 115/15* (2016.01)

(56) References Cited

U.S. PATENT DOCUMENTS

| | | | |
|---|---|---|---|
| 10,344,954 B1* | 7/2019 | Tischler | H05K 1/0274 |
| 10,731,814 B2 | 8/2020 | Yoon et al. | |
| 2014/0056020 A1 | 2/2014 | Bungenstock et al. | |
| 2014/0085916 A1* | 3/2014 | Dubosc | F21S 43/145 |
| | | | 362/516 |
| 2014/0098556 A1* | 4/2014 | von Malm | H10H 20/813 |
| | | | 362/543 |
| 2014/0103324 A1 | 4/2014 | Nakamura et al. | |
| 2016/0215949 A1* | 7/2016 | Tessnow | G02B 6/0096 |
| 2017/0292672 A1* | 10/2017 | Shido | B60Q 1/30 |
| 2017/0305332 A1 | 10/2017 | Albou et al. | |
| 2018/0006249 A1 | 1/2018 | Riedel et al. | |
| 2019/0025954 A1* | 1/2019 | Wang | F21V 33/0052 |
| 2019/0120457 A1* | 4/2019 | Alisafaee | F21S 41/143 |
| 2019/0308551 A1* | 10/2019 | Nursal | G01C 3/00 |
| 2021/0193750 A1 | 6/2021 | Shi et al. | |

FOREIGN PATENT DOCUMENTS

| | | | | |
|---|---|---|---|---|
| CN | 106796011 A | | 5/2017 | |
| CN | 110265464 A | * | 9/2019 | H01L 27/32 |
| CN | 111063716 A | | 4/2020 | |
| CN | 111384123 A | | 7/2020 | |
| CN | 211475808 U | | 9/2020 | |
| CN | 111878779 A | | 11/2020 | |
| CN | 113074351 A | | 7/2021 | |
| EP | 3309854 A1 | | 4/2018 | |
| WO | 2020/090980 A1 | | 5/2020 | |

OTHER PUBLICATIONS

PCT International Search Report dated Jun. 24, 2022, in connection with Int'l Application No. PCT/CN2022/085345 (5 pages, including English translation).
Chinese Office Action dated Jun. 1, 2022, issued in connection with Chinese Patent Appl. 202110372084.1 (12 pages, including English translation).
Chinese Office Action dated Nov. 8, 2022, issued in connection with Chinese Patent Appl. 202110372084.1 (10 pages, including English translation).
Extended European Searh Report dated Feb. 26, 2025, issued by the European Patent Office in connection with European Patent Application No. 22784056.8 (11 pages).

* cited by examiner

OLED LAMP PANEL WITH DISPLAY PERIPHERAL REGIONS AND DISPLAY REGION OF REGULAR SHAPE FORMED BY PLURALITY OF LIGHT EMITTING UNITS OF THE SAME SHAPE, AND LIGHTING DEVICE HAVING THE SAME

CROSS-REFERENCE TO RELATED APPLICATIONS

This is a National Stage Application, filed under 35 U.S.C. 371, of International Patent Application No. PCT/CN2022/085345, filed on Apr. 6, 2022, which claims priority to Chinese Patent Application No. 202110372084.1 filed with the China National Intellectual Property Administration (CNIPA) on Apr. 7, 2021, and titled OLED LAMP PANEL AND OLED VEHICLE LAMP, the disclosures of which are incorporated herein by reference in their entireties.

TECHNICAL FIELD

The present disclosure generally relates to the technical field of organic light-emitting diode (OLED) lighting and, in particular, an OLED lamp panel and a lighting device.

BACKGROUND

The OLED is increasingly widely accepted in the vehicular field. With increasing lamp requirements for automobile intelligence and comfort, the design space of lighting devices for vehicle lamps is compressed, and the number of OLED panels is gradually reduced, but the OLED is required to display more and more content. Furthermore, there are minimum light distribution requirements in the light distribution standards of vehicle lamps. Therefore, the conditions and environment of the OLED vehicle lamps are increasingly stringent, while the display and light distribution requirements are not reduced, and there are even more design requirements for display. As a result, it is difficult for existing OLED lamps to meet the design requirements of lighting devices for OLED vehicle lamps.

SUMMARY

In view of the preceding defects or deficiencies in the existing art, it is desired to provide an OLED lamp panel. A display region of the lamp panel includes at least one main display region and a display peripheral region.

The at least one main display region is regular in shape and is formed by splicing multiple main light-emitting units of the same shape.

The display peripheral region consists of a peripheral region I and/or a peripheral region II. The peripheral region I is formed of multiple first peripheral light-emitting units with regular shapes. The peripheral region II is formed of multiple second peripheral light-emitting units.

According to the technical scheme provided by embodiments of the present application, the first peripheral light-emitting unit or the second peripheral light-emitting unit has the same shape as a main light-emitting unit of the multiple main light-emitting units.

According to the technical scheme provided by embodiments of the present application, the distance between adjacent light-emitting units in the display region is $D_{adjacent}$, and $D_{adjacent} < D_{distinguishable}$. $D_{distinguishable}$ denotes a distance distinguishable by human eyes and satisfies the following formulas:

$D_{distinguishable} = 2*L*\mathrm{Sin}[(\Theta/2)*57.3]$;

$\Theta = 1.22*\lambda/2*n*R$.

L denotes the minimum distance between a person and a vehicle. λ denotes a main light-emitting wavelength of a main light-emitting unit of the multiple main light-emitting units. n denotes a refractive index of a human eye pupil. R denotes a set radius of the human eye pupil.

According to the technical scheme provided by embodiments of the present application, the side length of the main light-emitting unit and/or a first peripheral light-emitting unit of the multiple first peripheral light-emitting units is greater than or equal to $5*D_{distinguishable}$.

According to the technical scheme provided by embodiments of the present application, the shape of a main light-emitting unit of the multiple main light-emitting units is an n-sided polygon or a graph formed by cutting an n-sided polygon, wherein n≥3. The main light-emitting unit is formed of any one kind of polygonal pixels or special-shaped pixels or a combination of two or more kinds of polygonal pixels or special-shaped pixels. The main light-emitting unit is composed of at least three adjacent pixels. Driving voltages of the at least three adjacent pixels in the main light-emitting unit are completely different or partially different so that the main light-emitting unit forms a three-dimensional lighting pattern.

According to the technical scheme provided by embodiments of the present application, the shape of a first peripheral light-emitting unit of the multiple first peripheral light-emitting units is an n-sided polygon. The shapes of the multiple second peripheral light-emitting units include at least one of an n-sided polygon or a graph formed by cutting an n-sided polygon. wherein n≥3.

According to the technical scheme provided by embodiments of the present application, a corner of the main light-emitting unit and/or a corner of the first peripheral light-emitting unit and/or a corner of the second peripheral light-emitting unit is rounded. The ratio of the area removed by a rounded corner to the area of the light-emitting unit after the rounded corner is formed is less than or equal to 0.25.

According to the technical scheme provided by embodiments of the present application, a fractal pattern is formed between the main display region and a main light-emitting unit of the multiple main light-emitting units.

According to the technical scheme provided by embodiments of the present application, the ratio of the area of the largest pixel in a second peripheral light-emitting unit of the multiple second peripheral light-emitting units and/or the area of the largest pixel in a first peripheral light-emitting unit area of the multiple first peripheral light-emitting units to an area of the largest pixel in a main light-emitting unit of the multiple main light-emitting units ranges from 0.8 to 1.2.

In a second aspect, the present application provides a lighting device. The lighting device includes at least one OLED lamp panel described above and a reflective structure.

A light-emitting cavity is formed between the reflective structure and the OLED lamp panel. The reflective structure has at least two reflective mirrors located in the light-emitting cavity.

According to the technical scheme provided by embodiments of the present application, the display region is planar and has a light output direction perpendicular to the surface of the display region. For any one of the at least two reflective mirrors, the light projection area ratio of the display region on a reflective mirror in the light output direction of the display region is greater than or equal to 70%. The light projection area ratio is a proportion of the area of a light projection region of the display region on the reflective mirror in the light output direction of the display region to the area of the display region.

In the preceding technical schemes of the present application, the display region of the OLED lamp panel is designed to include at least one main display region and a display peripheral region. The main display region is regular in shape and formed by splicing multiple main light-emitting units of the same shape. Therefore, various display elements can be achieved in the main display region. For example, multiple graphic elements such as a triangle, a quadrangle, a diamond, a trapezoid, and a hexagon may be spliced so that multiple modes such as steering, rhythm, warning, and welcome can be achieved. The display peripheral region consists of a peripheral region I and a peripheral region II, so the full-screen display of the OLED lamp panel can be achieved, which not only meets the special-shaped requirements of the automobile taillights, but also improves the utilization rate of brightness space and area under the design requirements of the limited number and position of OLED lamp panels, and the high challenge design requirements of lighting devices can be satisfied.

According to the technical schemes provided by embodiments of the present application, the distance between light-emitting units in the display region is limited so that the distance between the light-emitting units in the display region cannot be perceived by human eyes, ensuring the integrity of graphics. Moreover, the side length of the light-emitting unit is configured to be more than 5 times the distinguishable distance of human eyes so that light-emitting graphics can be better perceived by the human eyes.

According to the technical scheme provided by embodiments of the present application, a light-emitting cavity is formed between the OLED lamp panel and the reflective structure. The reflective structure has at least two reflective mirrors located in the light-emitting cavity. Each reflective mirror is capable of reflecting light emitted by the OLED lamp panel and reflected light of other reflective mirrors. When the OLED lamp panel forms a light-emitting shape, the lighting device of the present application can form a plurality of light-emitting shapes through mirror reflection, thereby creating multiple molding effects of lighting devices. Furthermore, the intensity of light distribution is increased, and the internal usable space of the lighting device is improved. Therefore, compared with other lighting devices, under the same intensity of light distribution, the present scheme reduces the number of used light sources, thereby effectively reducing the overall cost.

BRIEF DESCRIPTION OF DRAWINGS

Other features, objects and advantages of the present application become more apparent after a detailed description of non-restrictive embodiments with reference to the drawings is read.

REFERENCE LIST

Figure 1A:
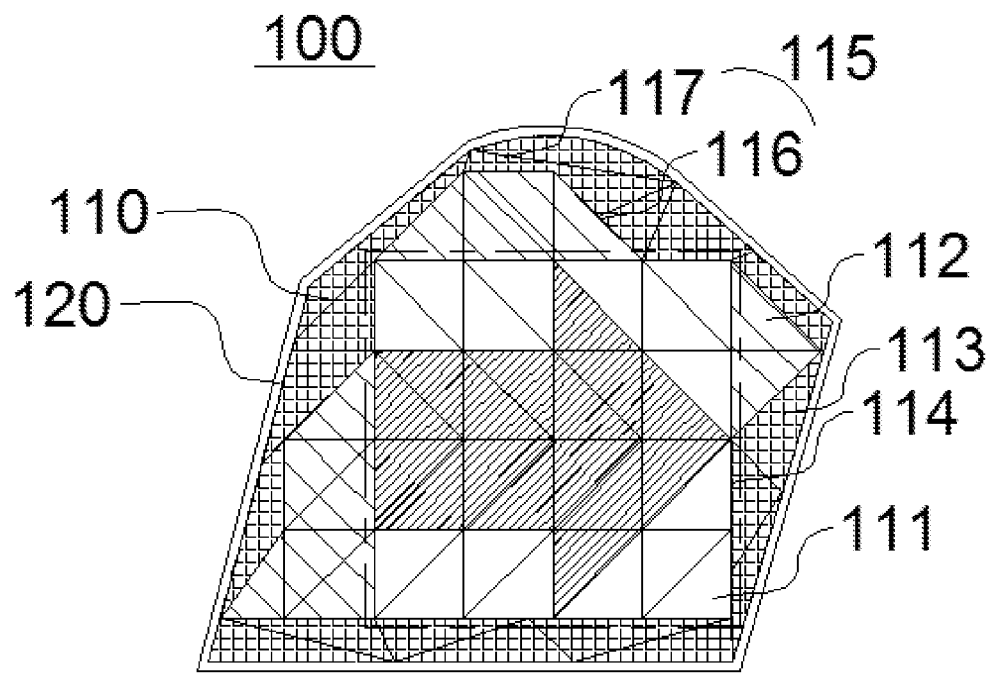
FIG. 1A is a diagram illustrating the structure of embodiment one of the present application.

100 OLED lamp panel
110 display region 120 non-display region
111a, 111b, 111c, 111d, 111e main light-emitting unit
112 first peripheral light-emitting unit
113 second peripheral light-emitting unit
114 main display region
115 display peripheral region
116 peripheral region I
117 peripheral region II
20 reflective structure
30 light-emitting cavity
21 reflective mirror
22 opening
21a first reflective mirror
21b second reflective mirror
21c third reflective mirror
31 first end
32 second end
100a first OLED lamp panel
100b second OLED lamp panel
2a, 2b, 2c, 2d, 2e pixel

DETAILED DESCRIPTION

The present application is further described in detail hereinafter in conjunction with the drawings and embodiments. It is to be understood that the embodiments described herein are intended to explain related inventions and not to limit the present invention. In addition, it should be noted that for ease of description, only the part related to the present invention is illustrated in the drawings.

It is to be noted that if not in collision, the embodiments and features therein in the present application can be combined with each other. The present application is described below in detail with reference to drawings and in conjunction with embodiments.

Embodiment One

Referring to FIG. 1A, this embodiment provides an OLED lamp panel 100. The lamp panel 100 is in an irregular and special shape formed by an enclosure of three straight edges and one arc edge. The lamp panel 100 is provided with a display region 110 and a non-display region 120. The display region 110 includes the following:
at least one main display region 114, where the at least one main display region 114 is regular in shape and is formed by splicing multiple main light-emitting units of the same shape; and
a display peripheral region 115, where the display peripheral region 115 consists of a peripheral region I 116 and/or a peripheral region II 117. In the example shown in FIG. 1A, the display peripheral region 115 includes the peripheral region I 116 and the peripheral region II 117. The peripheral region I 116 is formed by multiple first peripheral light-emitting units 112 with regular shapes. The peripheral region II 117 is formed by multiple second peripheral light-emitting units 113.

In some embodiments of the present application, the display peripheral region 115 may include only the peripheral region I 116. In some embodiments of the present application, the display peripheral region 115 may include only the peripheral region II 117.

The peripheral region II 117 refers to a part in the display region 110 except the main display region 114 and the peripheral region I 116, that is, the closed-graphic part surrounded by the outermost edge contour line of the display region and the outer edge line of the peripheral region II 117.

The preceding design of the main display region 114 and the display peripheral region 115 achieves the full-screen display on a special-shaped OLED lamp panel. This configuration maximizes the use of the space of the OLED lamp panels and ensures that when the preceding design is applied to vehicle lamps, the brightness of the vehicle lamps can also be guaranteed even if the number and the space are compressed.

In some embodiments of the present application, since the shape of the OLED lamp panel is relatively continuous and complete, the number of the main display region is designed to be one and a square. In other embodiments, multiple main body regions may be designed according to the shape of the OLED lamp panel, and the shape and size of each main display region may be the same or different.

In some embodiments of the present application, the shape of the main display region may also be a triangle or a regular n-sided polygon, where n≥5.

Due to the regularized design of the main display region 114, different combinations of the main light-emitting units 111 may be selectively turned on to meet the different indication requirements of the vehicle lamp.

Figure 1B:
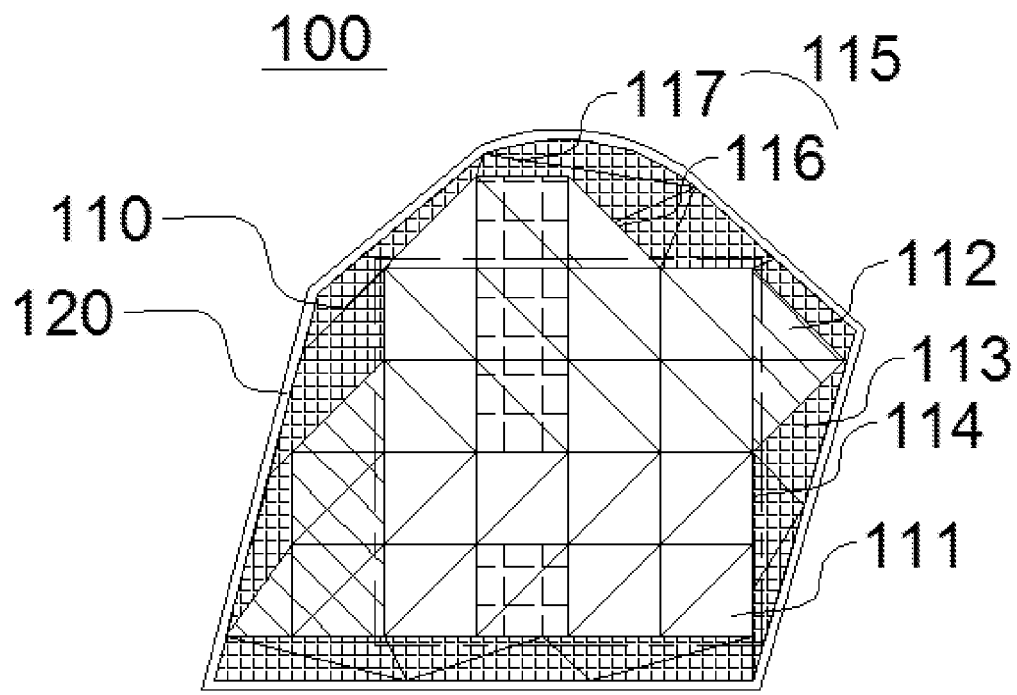
FIG. 1B is a diagram illustrating the structure of embodiment one of the present application.

As shown in FIG. 1A and FIG. 1B, the main display region 114 is a regular square formed by right-angled triangular main light-emitting units 111 with the same shape and area. When the main display region 114 is turned on, different main light-emitting units 111 may be turned on to achieve indication functions such as turning, rhythm, warning, and welcome.

For example, as shown in FIG. 1A, turning on main light-emitting units 111 in the shadow of the main display region 114 may indicate a right turn.

In other embodiments, turning on the main light-emitting units 111 in the shadow of the main display region 114 may indicate rhythm. Turning-on of each light-emitting unit is expressed by a timing function, or on and off of the OLED are controlled at different time intervals.

For example, as shown in FIG. 1B, turning on the main light-emitting units 111 in the shadow of the main display region 114 at a set frequency may indicate warning.

In other embodiments, turning on the main light-emitting units 111 in the shadow of the main display region 114 may indicate welcome. For example, the indication for welcome may also be similar to the rhythm.

Figure 2:
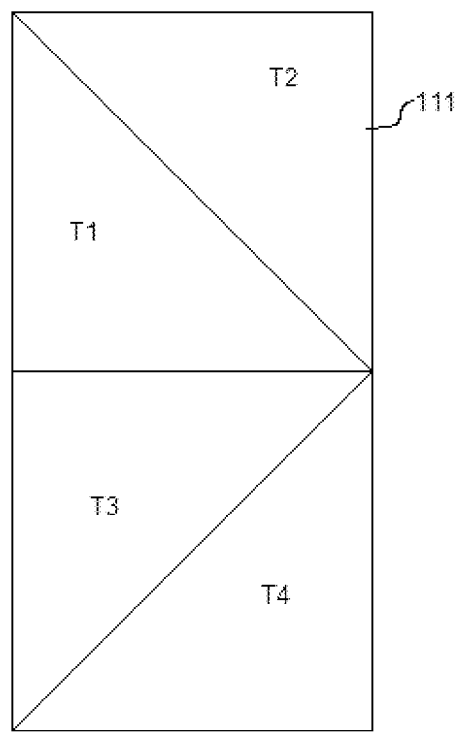
FIG. 2 is a diagram illustrating the structure of a main light-emitting unit in embodiment one of the present application.

As shown in FIG. 2, in this embodiment, the main light-emitting units 111 are in the shape of a right-angled triangle. The main display region 114 includes at least one pair composed of a first main light-emitting unit $T_1$ and a second main light-emitting unit $T_2$. The main display region 114 also includes at least one pair composed of a third main light-emitting unit $T_3$ and a fourth main light-emitting unit $T_4$.

The second main light-emitting unit $T_2$ is obtained after the first main light-emitting unit $T_1$ is mirrored along the hypotenuse of the first main light-emitting unit $T_1$.

The third main light-emitting unit $T_3$ is obtained after the first main light-emitting unit $T_1$ is mirrored along any right-angle side of the first main light-emitting unit $T_1$.

The fourth main light-emitting unit $T_4$ is obtained after the third main light-emitting unit $T_3$ is mirrored along the hypotenuse of the third main light-emitting unit $T_3$.

The preceding shape and arrangement of the main light-emitting units 111 are designed such that an arrow shape of steering can be formed in the main display region 110.

In some embodiments of the present application, the ratio of the area $S_{main}$ of the entire main display region 114 to the total area Statai of the display region of the lamp panel is greater than or equal to 80%. In this manner, information about various kinds of elements can be displayed to the maximum extent through the main display region 114 so that the display effect of graphics is enhanced, and the advantage of the OLED surface light source is highlighted.

Figure 3:
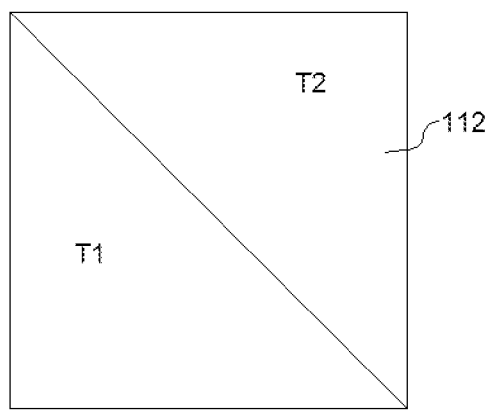
FIG. 3 is a diagram illustrating a structure of a first peripheral light-emitting unit in embodiment one of the present application.
Figure 4:
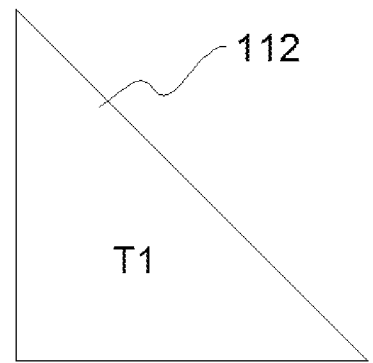
FIG. 4 is a diagram illustrating another structure of the first peripheral light-emitting unit in embodiment one of the present application.

In this embodiment, the first peripheral light-emitting unit 112 has the same shape as the main light-emitting unit 111. This configuration makes the brightness of the entire OLED lamp panel more uniform. Furthermore, when the first peripheral light-emitting unit 112 is designed in the peripheral region I 116, on the premise that the region area is satisfied, the design shape is preferentially selected as one pair composed of the first main light-emitting unit $T_1$ and the second main light-emitting unit $T_2$, that is, the shape shown in FIG. 3; on the premise that the region area is not satisfied, the shape is designed as the first main light-emitting unit $T_1$, that is, the shape shown in FIG. 4. In other embodiments, the shape may also be designed as the second main light-emitting unit $T_2$ or the third main light-emitting unit $T_3$ or the fourth main light-emitting unit $T_4$. In this manner, the overall shape is more uniform and beautiful.

The peripheral region II 117 is formed by multiple second peripheral light-emitting units 113. The second peripheral light-emitting units 113 are designed in the peripheral region II 117 and may be regular or irregular. In some embodiments of the present application, the area of the second peripheral light-emitting unit 113 is 80% to 120% of the area of the first peripheral light-emitting unit 112. The uniformity of the screen brightness can be further improved by designing an almost equivalent area of each light-emitting unit.

In some embodiments of the present application, the area $S_a$ of the peripheral region II 117 and the area $S_b$ of the peripheral region I 116 satisfy the following formula:

$$0.8 \leq S_a/S_b \leq 1.2.$$

In the same device structure, according to the formula, $BS = \eta * I$, B denotes brightness in units of $cd/m^2$, S denotes an area in units of $m^2$, $\eta$ denotes a luminous efficiency in units of cd/A, and A denotes current I, under the condition of a fixed area, the brightness is proportional to the current, therefore, to ensure the uniformity of luminance, the preceding area ratio is set at 80% to 120%, and a relatively good uniformity of luminance of the OLED light-emitting panel can be ensured.

In some embodiments of the present application, the distance between adjacent light-emitting units in the display region 110 is $D_{adjacent}$, and $D_{adjacent} < D_{distinguishable}$. Between adjacent light-emitting units includes between two adjacent main light-emitting units 111, between two adjacent first peripheral light-emitting units 112, between two adjacent second peripheral light-emitting units 113, between a main light-emitting unit 111 and a first peripheral light-emitting unit 112 that are adjacent to each other, and between a first peripheral light-emitting unit 112 and a second peripheral light-emitting unit 113 that are adjacent to each other. $D_{distinguishable}$ denotes a distance distinguishable by human eyes and satisfies the following formulas:

$$D_{distinguishable} = 2*L*Sin[(\Theta/2)*57.3];$$

$$\Theta = 1.22*\lambda/2*n*R.$$

L denotes the minimum distance between a person and a vehicle. $\lambda$ denotes a wavelength of a main light-emitting unit. In this embodiment, $\lambda$ refers to the wavelength of red light. The wavelength of red light is relatively long, and the transmittance of red light is relatively strong. The present disclosure is mainly applied to red-light OLED vehicle lamps. Of course, in other embodiments, for example, when the color of the OLED vehicle lamp is another color, $\lambda$ may refer to the wavelength of a light wave of the another color. When the OLED vehicle lamp has multiple main light-emitting units of different colors, $\lambda$ refers to the wavelength of the main light-emitting unit having the longest wavelength. n denotes a refractive index of a human eye pupil. R denotes a set radius of the human eye pupil.

For example, when the OLED lamp panel provided by this embodiment is used as a red automobile taillight, $\lambda = 624$ nm. L, that is, the minimum distance between a person and a vehicle, is generally set according to the habit. In this embodiment, L=3 m, and n=1.34. When the pupil diameter is set to 3 mm, the minimum visual distinguishable angle $\Theta$ of human eyes may be obtained as follows:

$$\Theta = 1.22\lambda/2*n*R = 1.22*624*10^{-9}/(1.34*3*10^{-3}) = 0.0001893 \text{ (rId)}$$

$$D_{distinguishable} = 2*L*Sin(\Theta/2*57.3) = 0.56 \text{ mm}.$$

In this manner, the distance between adjacent light-emitting units is not perceived by human eyes, ensuring the integrity of graphics.

To make the light-emitting graphic better perceived by human eyes and ensure the integrity of light-emitting graphics, the side length of the main light-emitting unit 111 and/or the side length of the first peripheral light-emitting unit 112 is greater than or equal to $5*D_{distinguishable}$.

For example, assuming that the side length of the main light-emitting unit 111 and/or the side length of the first peripheral light-emitting unit 112 is greater than or equal to $5*D_{distinguishable}$, that is, in this embodiment, the side length of the right-angled triangular light-emitting units (including the main light-emitting units 111 and the first peripheral light-emitting units 112) is greater than or equal to 2.8 mm, and correspondingly, the area of the light-emitting units is greater than or equal to 3.92 $mm^2$.

For example, assuming that the side length of the main light-emitting unit 111 and/or the side length of the first peripheral light-emitting unit 112 is greater than or equal to $9*D_{distinguishable}$, that is, in this embodiment, the side length of the right-angled triangular light-emitting units (including the main light-emitting unit 111 and the first peripheral light-emitting unit 112) is greater than or equal to 5 mm, and correspondingly, the area of the right-angled triangular light-emitting units is greater than or equal to 12.5 $mm^2$.

Embodiment Two

Figure 5:
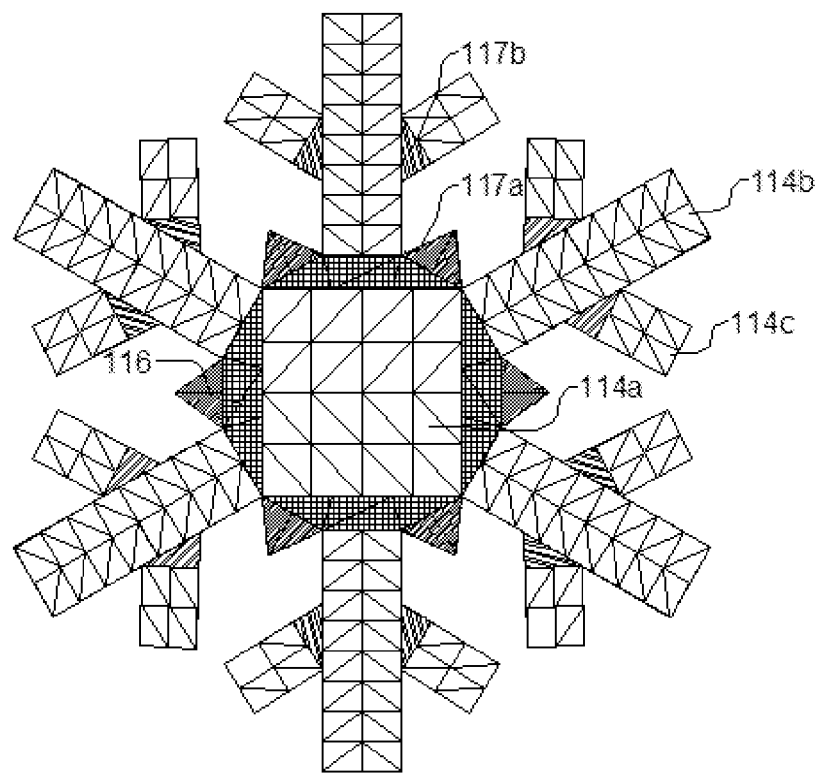
FIG. 5 is a diagram illustrating the structure of embodiment two of the present application.

As shown in FIG. 5, on the basis of embodiment one, the OLED lamp panel provided by this embodiment is snowflake-shaped and has 19 main display regions 114 of three types and 16 display peripheral regions 115. The main display regions 114 include a first main display region 114a located in the center, a second main display region 114b located on the branch, and a third main display region 114c located on the leaf. The first main display region 114a located in the center includes a total of 32 right-angled triangular main light-emitting units 111, each of which has an area of 17.7 $mm^2$. The second main display region 114b located on the branch includes a total of 32 right-angled triangular main light-emitting units 111, each of which has an area of 8 $mm^2$. The third main display region 114c located on the leaf includes a total of 4 right-angled triangular main light-emitting units 111, each of which has an area of 8 $mm^2$. The main light-emitting units in different main display regions have the same shape.

The display peripheral region 115 includes one peripheral region I 116 and two peripheral regions II of 117a and 117b. The display peripheral region 115 adjacent to the center includes both the peripheral region I 116 and the peripheral region II 117a. The peripheral region I 116 includes 12 right-angled triangular first peripheral light-emitting units 112. The peripheral region II 117a includes 16 non-right-angled triangular second peripheral light-emitting units 113, each of which has the light-emitting area of 10 mm². The display peripheral region 115 adjacent to the branch includes only the peripheral region II 117b, and the peripheral region II 117b includes 12 second peripheral light-emitting units 113, each of which has an area of 13.7 mm².

When all the light-emitting units in the display region are turned on, a snowflake shape may be formed. When some of the main light-emitting units are selectively turned on in the main display region in the center alone, the requirements for some basic lamp indication shapes can be met.

Embodiment Three

Figure 6:
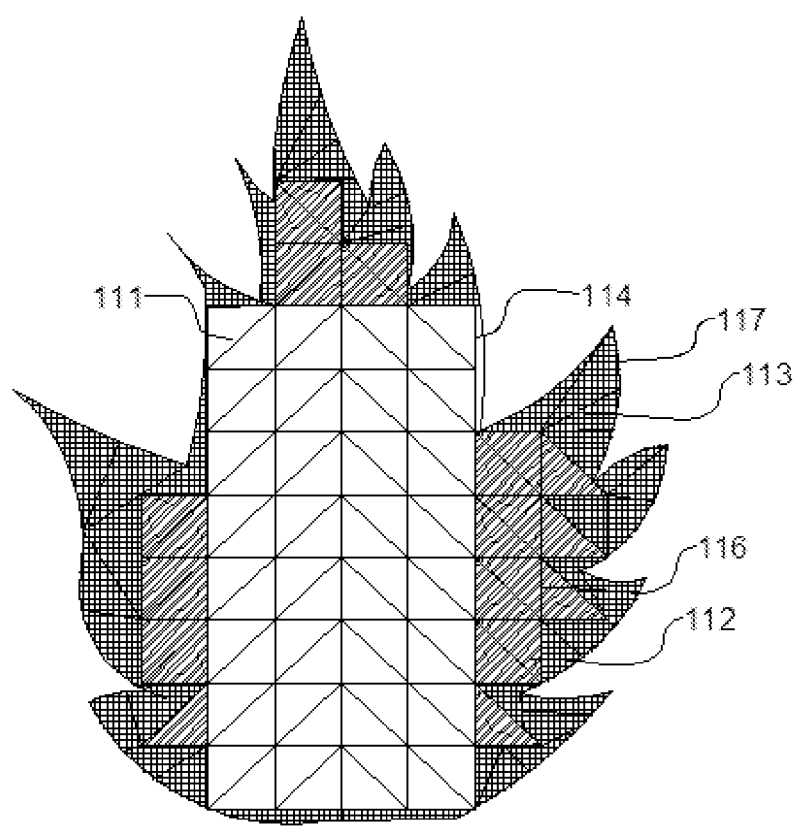
FIG. 6 is a diagram illustrating the structure of embodiment three of the present application.

As shown in FIG. 6, on the basis of embodiment one, the OLED lamp panel provided by this embodiment is leaf-shaped and has one main display region 114 and one display peripheral region 115. The main display region 114 includes 64 main light-emitting units 111, each of which has the light-emitting area of 25 mm². The display peripheral region 115 includes a peripheral region I 116 and a peripheral region II 117. The peripheral region I 116 includes 25 regular first peripheral light-emitting units 112 (filled with oblique lines). The peripheral region II 117 includes a plurality of irregular second peripheral light-emitting units 117 (filled with blocks). When all the light-emitting units in the display region are turned on, a leaf shape may be formed. When some of the main light-emitting units are selectively turned on in the main display region in the center alone, the requirements for some basic lamp indication shapes can be met.

Embodiment Four

Figure 7:
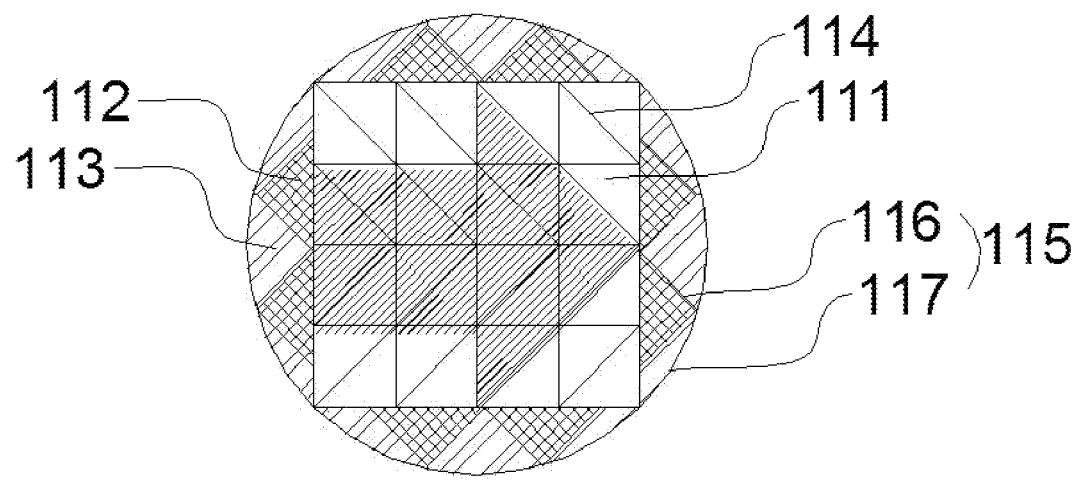
FIG. 7 is a diagram illustrating the structure of embodiment four of the present application.

As shown in FIG. 7, on the basis of embodiment one, the OLED lamp panel provided by this embodiment is circular and has one main display region 114 and one display peripheral region 115. The main display region 114 includes 32 main light-emitting units 111, each of which has the light-emitting area of 25 mm². The display peripheral region 115 includes 8 regular first peripheral light-emitting units 112 (filled with blocks) and several irregular second peripheral light-emitting units 113 (filled with oblique lines). When all light-emitting units in the display region are turned on, a circle may be formed. When some of the main light-emitting units are selectively turned on in the main display region in the center alone, the requirements for some basic lamp indication shapes can be met.

Embodiment Five

Figure 8:
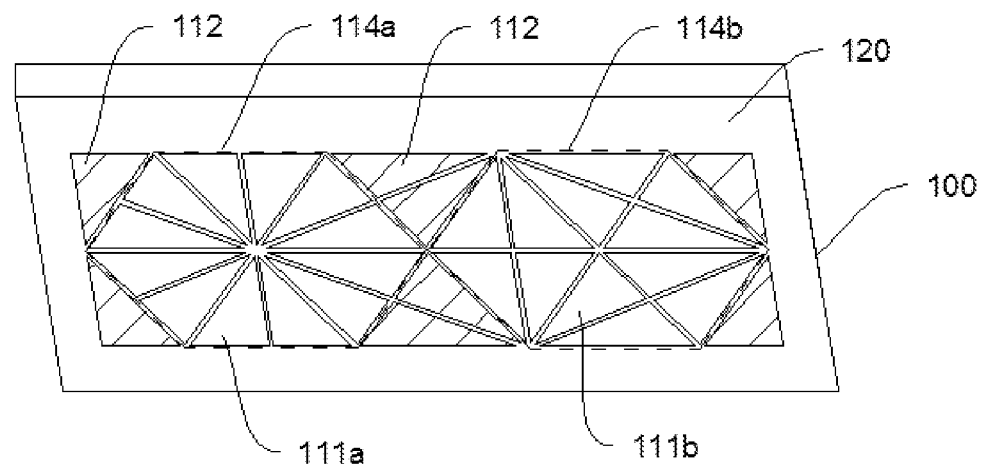
FIG. 8 is a diagram illustrating the structure of embodiment five of the present application.

As shown in FIG. 8, this embodiment provides an OLED lamp panel 100. The lamp panel 100 is provided with a display region and a non-display region 120.

The display region includes two hexagonal main display regions (114a, 114b). For ease of viewing, the main display region 114a and the main display region 114b are delimited by dotted lines in FIG. 8. The main display region 114a is formed by 12 triangular main light-emitting units 111a of the same shape. The main display region 114b is also formed by 12 triangular main light-emitting units 111b of the same shape. The main light-emitting units 111a in the main display region 114a are arranged symmetrically with the center of the hexagon. The main light-emitting units 111b in the main display region 114b are formed by cutting diagonal lines of the hexagon.

The peripheral region 115 is formed by triangular first peripheral light-emitting units 112. In other words, it can be understood that in this embodiment, the display peripheral region includes only the peripheral region I without peripheral region II.

In some embodiment, the main light-emitting unit may be other n-sided polygons, such as a triangle, a quadrangle, a pentagon, and a heptagon. Alternatively, the shape of the main light-emitting unit is formed by randomly cutting a line connecting two points on an edge of an n-sided polygon (the line may be a straight line or a bent line), where n≥3.

In some embodiments of the present application, the shape of the first peripheral light-emitting unit 112 is an n-sided polygon, such as a diamond, a pentagon, and a triangle.

In some embodiments of the present application, the shape of the second peripheral light-emitting unit is an n-sided polygon or a graphic formed by cutting an n-sided polygon, or the shape of the second peripheral light-emitting unit is formed by randomly cutting a line connecting two points on an edge of an n-sided polygon (the line may be a straight line or a bent line), where n≥3.

Embodiment Six

In this embodiment, on the basis of any one of the preceding embodiments, the main light-emitting unit is formed of any one kind of polygonal pixels or special-shaped pixels, or a combination of two or more kinds of polygonal pixels or special-shaped pixels. The main light-emitting unit is composed of at least three adjacent pixels. A driving voltage of each pixel in the main light-emitting unit is completely different or partially different so that the light-emitting unit forms a solid lighting pattern.

In the existing art, the OLED lamp panel sequentially includes a substrate, an anode, an organic functional layer, and a cathode. The organic functional layer forms a complete display region. During operation, only the anode and the cathode need to be energized so that the entire screen is turned on.

A main light-emitting unit of an OLED lamp panel provided by this embodiment is divided into three pixels. When the three pixels are of the same color, the anode is insulated by the insulating layer, and power is supplied to each pixel separately. Different pixels are turned on by supplying the power to different pixels. Therefore, lighting patterns with different shapes are formed by turned-on pixels, achieving the intelligence and pixelation of the OLED lighting screen.

A main light-emitting unit of another OLED lamp panel provided by this embodiment is divided into three pixels. When the three pixels are of different colors, three pixels and the corresponding anode and/or the organic functional layer are separated by an insulating layer, and each pixel is powered individually. Power is supplied to different pixels so that different pixels are turned on. Therefore, lighting patterns with different shapes and colors are formed by turned-on pixels, achieving the intelligence and pixelation of the OLED lighting screen.

The shape of pixels includes various triangular shapes such as an equilateral triangle, a right-angled triangle, and an irregular triangle, various quadrilateral shapes such as a parallelogram and an irregular quadrilateral, and various other polygonal shapes such as a pentagon, a hexagon, a heptagon, and an octagon, and the shape may be any other shapes designed as required. The cooperation of some different pixels may form main light-emitting units of different shapes. Meanwhile, one, two, or more pixels of the same shape and adjacent to each other may form one light-emitting unit. Two or more pixels of different shapes and adjacent to each other may also form one light-emitting unit.

Figure 9:
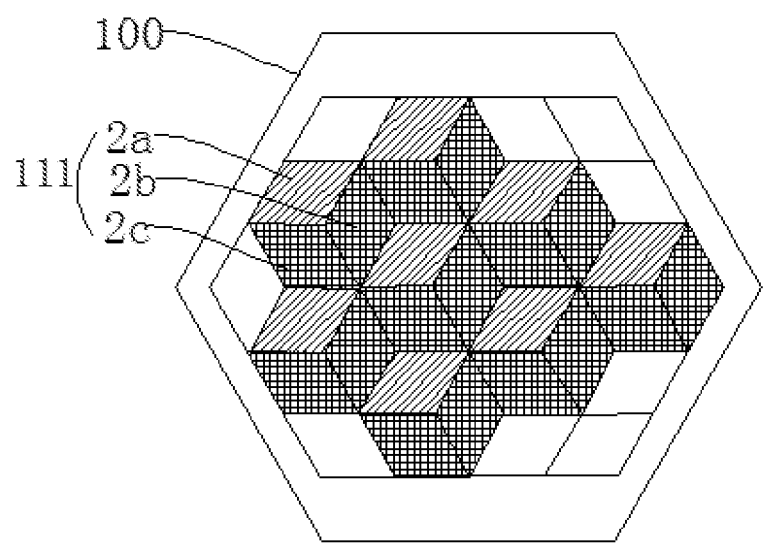
FIG. 9 is a diagram illustrating a first structure of the OLED lamp panel in embodiment six of the present application.

As shown in FIG. 9, in the OLED lamp panel 100 provided in this embodiment, pixels (2a, 2b, 2c) have the shape of a diamond, the total number of pixels is 33, and a group of pixels (2a, 2b, 2c) form one main light-emitting unit 111. Meanwhile, in this embodiment, the display region is hexagonal, and the shape of the OLED lamp panel 100 is also designed as the corresponding hexagon. In this manner, the profile of the OLED lamp panel 100 is adapted to the profile of the display region, while the profile of the OLED lamp panel 100 is also adapted to the profile of the main light-emitting units 111. Thus the aesthetic of the OLED lamp panel 100 is improved. As shown in FIG. 9, three diamond-shaped pixels form one main light-emitting unit 111. When driving voltages of these three pixels (2a, 2b, 2c) in this main light-emitting unit 111 are different, a solid lighting pattern may be formed.

The solid lighting pattern formed by the main light-emitting unit 111 is shown in the shaded part of FIG. 9. Some diamond-shaped pixels are turned on, and the brightness of pixel 2a on the top surface of the cube is lower than the brightness of pixels (2b, 2c) on the side, thereby achieving a three-dimensional visual effect of superimposing multiple cubes.

Figure 10:
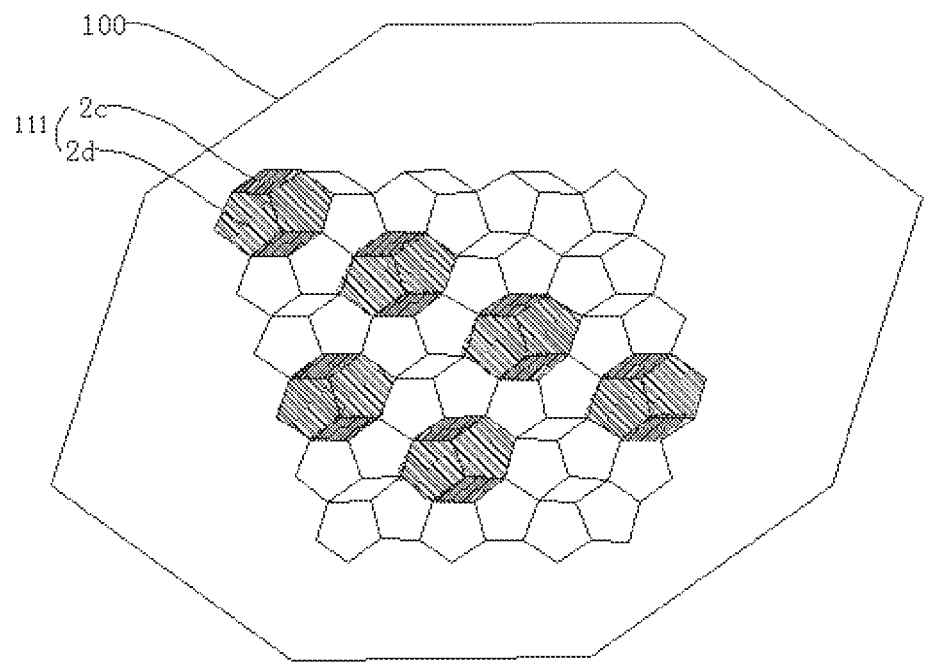
FIG. 10 is a diagram illustrating a second structure of the OLED lamp panel in embodiment six of the present application.

As shown in FIG. 10, the shape of the pixel (2c) provided in this embodiment is a diamond. The shape of the pixel (2d) is a pentagon. The shape of the OLED lamp panel is an octagon. All pentagonal pixels and diamond-shaped pixels are arranged to form one octagonal main light-emitting unit 111. When two adjacent pentagonal pixels and diamond-shaped pixels respectively adjacent to the two pentagonal pixels form one main light-emitting unit 111, the lighting pattern of a solid polyhedral shape as shown in the shaded part of FIG. 10 may be obtained by turning on different main light-emitting units 111. In the main light-emitting unit 111, a driving voltage, such as 4.3 V, is supplied to the two pentagonal pixels 2d, and another driving voltage, such as 4 V, is supplied to the two diamond-shaped pixels 2c so that the pixels in the main light-emitting unit 111 have two kinds of brightness. The two kinds of brightness in cooperation with the shapes of pixels in the main light-emitting unit 111 form a solid bubble-shaped lighting pattern. Similarly, in this embodiment, only part of the pixels may be turned on to form other lighting patterns.

Figure 11:
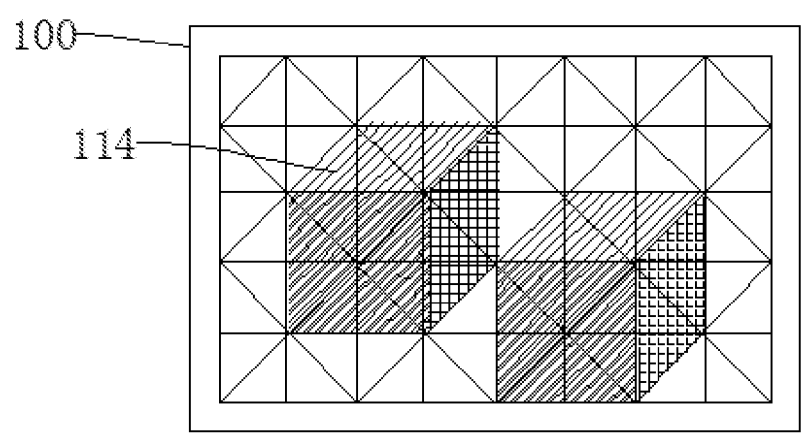
FIG. 11 is a diagram illustrating a third structure of the OLED lamp panel in embodiment six of the present application.

As shown in FIG. 11, the shape of the pixels provided in this embodiment is a right-angled triangle. The right-angled triangular pixels are arranged to form a display region 110 having a rectangular profile and a Pozi shape in the middle. The shape of the OLED lamp panel is the corresponding rectangle so that the profile of the OLED lamp panel is adapted to the profile of the display region and is more attractive. In this embodiment, a combination formed by pixels covered by the shaded part in FIG. 11 may be defined as one main light-emitting unit 111. A solid lighting pattern as shown by the pixels in the shaded part in FIG. 11 may be formed by turning on the main light-emitting unit 111. In this embodiment, some pixels in one main light-emitting unit 111 share one driving voltage, and three different driving voltages form different brightness of the three surfaces of the cube, thereby achieving the effect of a solid lighting pattern.

In some embodiments, the lighting brightness of the OLED lamp panel may be appropriately reduced relative to the brightness of the lighting screen in the existing art to increase the service life of the lighting screen. For example, the brightness of the screen ranges from 800 cd/m$^2$ to 900 cd/m$^2$.

In this embodiment, the main light-emitting unit 111 of the OLED lamp panel is divided to form three or more pixels. These pixels are designed as polygons. Pixels of the same or different shapes form different main light-emitting units 111. Different main light-emitting units 111 are powered on separately so that turned-on main light-emitting units 111 form a solid lighting pattern. When colors of different pixels in the same main light-emitting unit 111 are different or the colors of pixels in different main light-emitting units 111 are different, lighting patterns with changing color matching may be formed, and the intelligence and pixelation of the OLED lighting screen are achieved.

The preceding is illustrative of a manner in which embodiments of the present application may be implemented, and is not limited to the preceding embodiments. For example, the profile of the OLED lamp panel may be formed by other polygonal or special-shaped geometric pixels. For example, the profile of the display region may be formed by other polygonal or special-shaped geometric pixels. In this embodiment, the pixels adopt the shape of a polygon so that when formed, the pattern can be more continuous and attractive. Based on the design idea of the present disclosure, it is not ruled out that the pixels are designed in a special-shaped form, such as a scattered four-leaf clover shape or a circle, which are all within the protection scope of the present application.

Embodiment Seven

In some embodiments of the present application, a corner of the main light-emitting unit and/or a corner of the first peripheral light-emitting unit and/or a corner of the second peripheral light-emitting unit is rounded. The ratio of the area removed by the rounded corner to the area of the light-emitting unit after the rounded corner is formed is less than or equal to 0.25.

Figure 12:
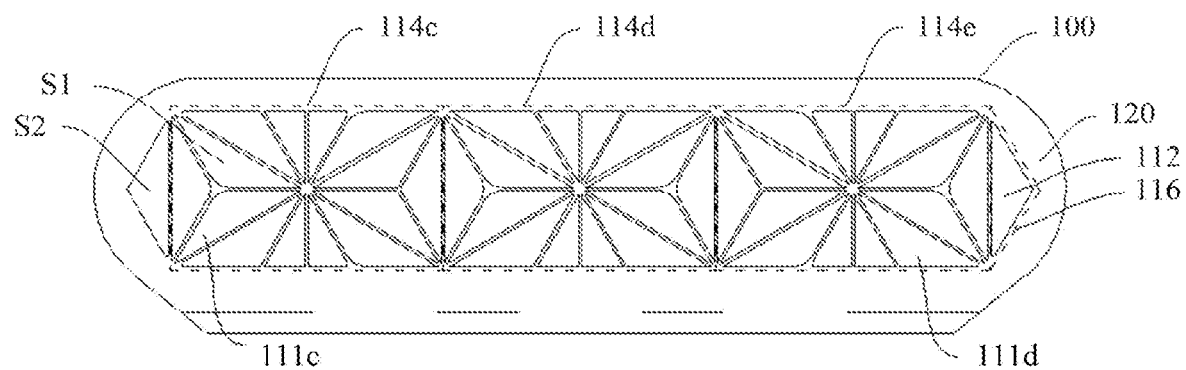
FIG. 12 is a diagram illustrating the structure of the OLED lamp panel in embodiment seven of the present application.

As shown in FIG. 12, the OLED lamp panel is in the shape of a racetrack as a whole. The display region of the OLED lamp panel is provided with three rectangular main display regions (114c, 114d, 114e) and two peripheral regions I 116. The main display regions (114c, 114d, 114e) include main light-emitting units 111c and main light-emitting units 111d. The main light-emitting unit 111c is a triangle whose top corner is rounded. The main light-emitting unit 111d is also a triangle having a rounded bottom corner. The peripheral region I 116 includes first peripheral light-emitting units 112 without rounded corner. In some embodiments, the corners of the first peripheral light-emitting unit 112 may be provided with a rounded corner.

In the OLED screen shown in FIG. 12, the display peripheral region is only provided with the peripheral region I. In some embodiments of the present application, the peripheral region II may be further provided, furthermore, second peripheral light-emitting units in the peripheral region II may be configured with a rounded corner.

In some embodiments of the present application, a corner of the main light-emitting unit and/or a corner of the first peripheral light-emitting unit and/or a corner of the second peripheral light-emitting unit is rounded. The ratio of the area removed by the rounded corner to the area of a light-emitting unit after the rounded corner is formed is less than or equal to 0.25.

Figure 13:
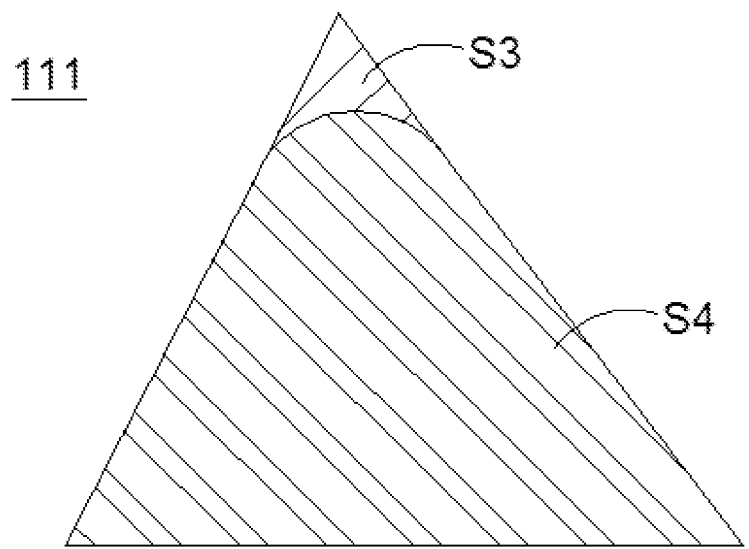
FIG. 13 is a diagram illustrating the structure of rounded corners of the OLED lamp panel in embodiment seven of the present application.

As shown in FIG. 13, the main light-emitting unit 111 of a certain triangle is taken as an example. The top corner of the main light-emitting unit 111 is rounded. The area removed by the rounded corner is S3. The area of the light-emitting unit after the rounded corner is formed is S4. S3/S4 is less than or equal to 0.25. In FIG. 13, S3/S4=0.1.

In some embodiments of the present application, the ratio of the area of the largest pixel in the second peripheral light-emitting unit and/or the area of the largest pixel in the first peripheral light-emitting unit area to the area of the largest pixel in the main light-emitting unit ranges from 0.8 to 1.2.

As shown in FIG. 12, the first peripheral light-emitting unit 112 is composed of one pixel whose area S2 is the largest pixel area of the first peripheral light-emitting unit 112. The main light-emitting unit 111c is composed of one pixel whose area is S1, and the one pixel has the largest area in the main light-emitting units. S2/S1=1.1.

Embodiment Eight

On the basis of embodiment one, a fractal pattern is formed between the main display region 114 and the main light-emitting units 111.

A fractal is generally defined as "a rough or fragmented geometric shape that may be subdivided in parts, each of the parts is at least approximately a reduced-size copy of the whole", that is, the parts have a property called self-similarity. In the field of mathematics, Koch curve, Sierpinski triangle, and Cantor set are all fractal graphics.

Figure 14:
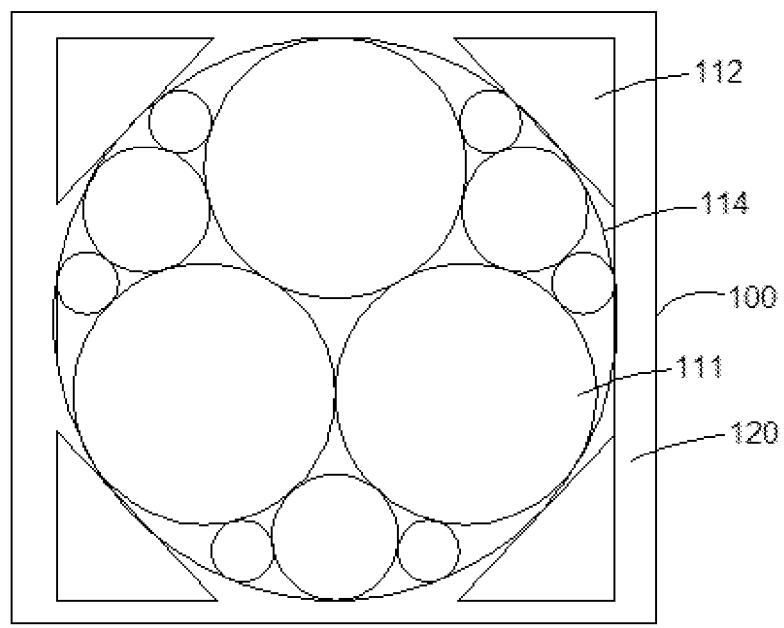
FIG. 14 is a diagram illustrating a first structure of the OLED lamp panel in embodiment eight of the present application.

For example, as shown in FIG. 14, the OLED lamp panel 100 is a square, and its display region is also approximately a square. The main display region 114 of the OLED lamp panel 100 is a circle composed of several circular main light-emitting units 111 of different sizes. A fractal pattern is formed between the circular main display region 114 and the circular main light-emitting units 111. The main display region 114 and the peripheral region I composed of four triangular first peripheral light-emitting units 112 together form a display region having a contour similar to a square.

Figure 15:
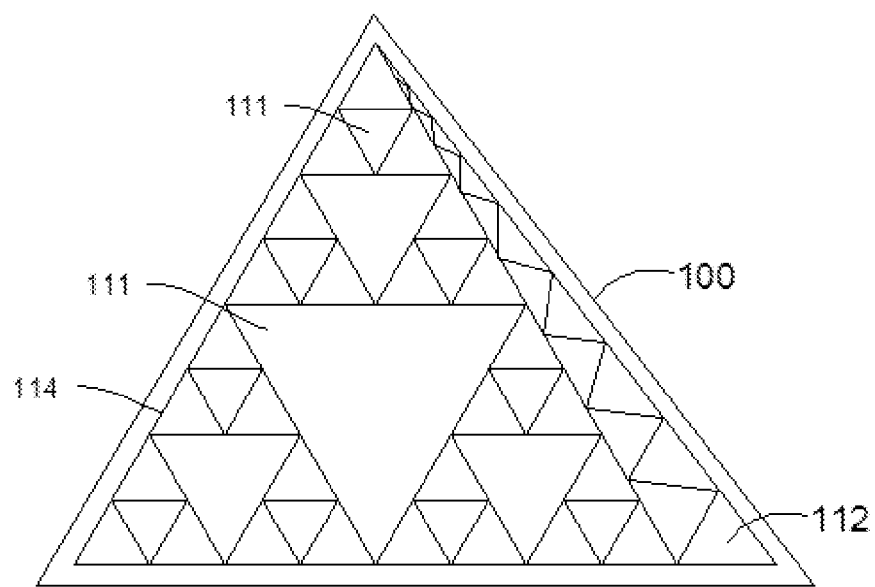
FIG. 15 is a diagram illustrating a second structure of the OLED lamp panel in embodiment eight of the present application.

For example, as shown in FIG. 15, the OLED lamp panel 100 is an oblique triangle, and its display region is also an oblique triangle, similar to its contour. The main display region 114 of the OLED lamp panel 100 is a regular triangle and composed of several main light-emitting units 111 of different sizes that are regular triangles. A fractal pattern is formed between the main display region 114 of the regular triangle and the main light-emitting units 111 of the regular triangles. The main display region 114 and the peripheral region I composed of several triangular first peripheral light-emitting units 112 together form a display region having a contour similar to an oblique triangle.

Embodiment Nine

This embodiment provides a lighting device composed of the OLED lamp panel of embodiment four. A fractal pattern is formed between the shape of the lighting device and the OLED lamp panel.

Figure 16:
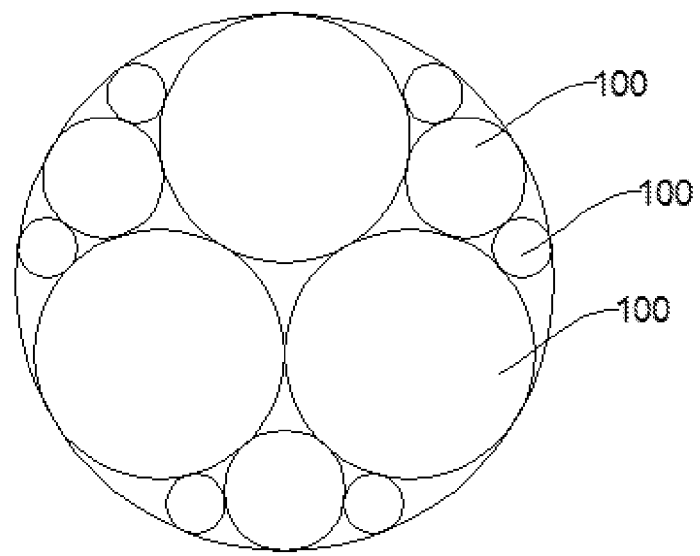
FIG. 16 is a diagram illustrating the structure of an implementation of embodiment nine of the present application.

As shown in FIG. 16, the lighting device is generally circular in shape and is formed by a fractal design of several circular OLED lamp panels 100 of different sizes. Each OLED lamp panel is designed using the scheme described in embodiment four.

The lighting device may be generally triangular in shape and is formed by the fractal design of several circular OLED lamp panels 100 of different sizes.

The lighting device may also be generally hexagonal in shape and is formed by the fractal design of several circular OLED lamp panels 100 of different sizes.

Figure 17:
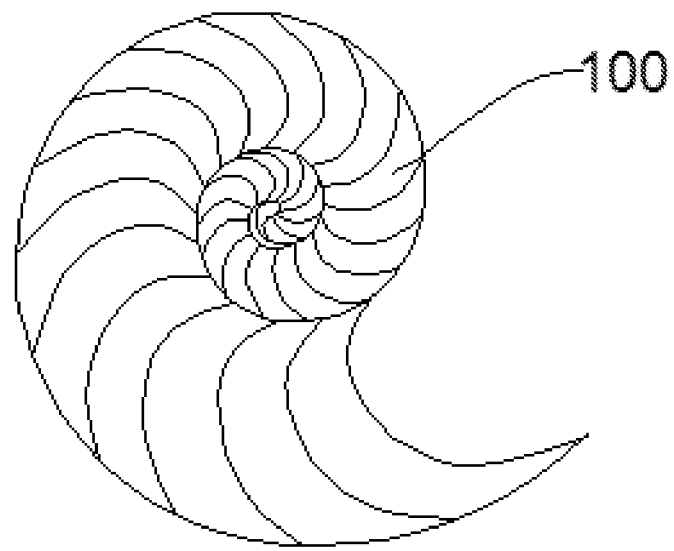
FIG. 17 is a diagram illustrating the structure of an implementation of embodiment nine of the present application.

As shown in FIG. 17, the lighting device is generally spiral in shape and is formed by the fractal design of several irregular OLED lamp panels 100 of different sizes. Each OLED lamp panel is designed using a scheme similar to that described in the preceding embodiments.

Figure 18:
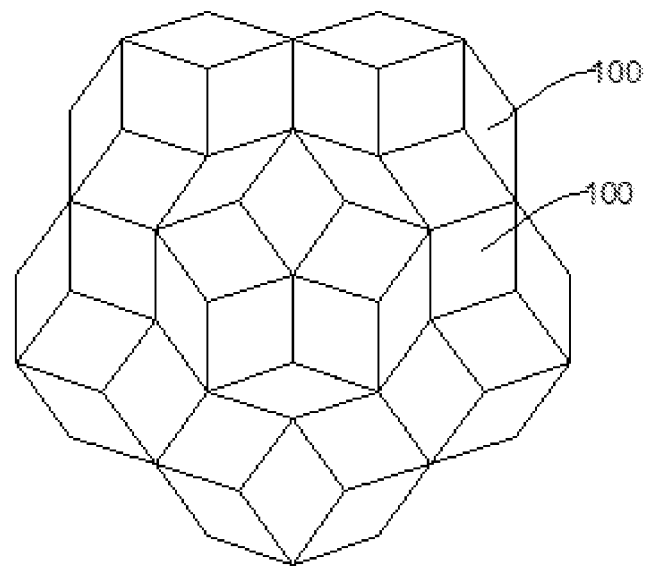
FIG. 18 is a diagram illustrating the structure of an implementation of embodiment nine of the present application.

As shown in FIG. 18, the lighting device is generally an irregular polygon in shape and is formed by the fractal design of several diamond-shaped OLED lamp panels 100 of different sizes. Each OLED lamp panel is designed using a scheme similar to that described in the preceding embodiments.

Figure 19:
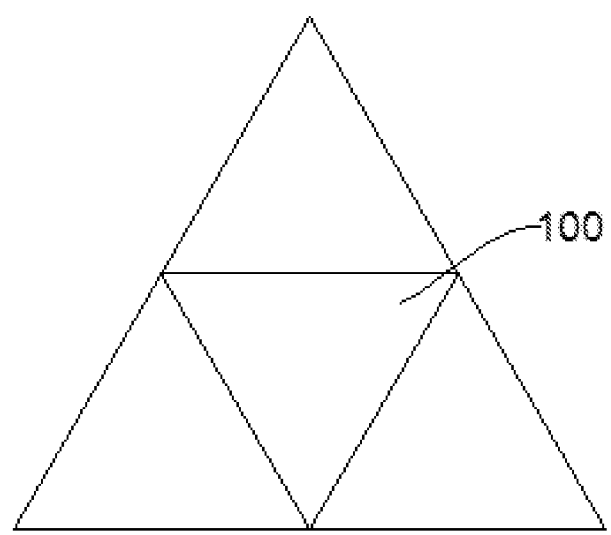
FIG. 19 is a diagram illustrating the structure of an implementation of embodiment nine of the present application.
Figure 20:
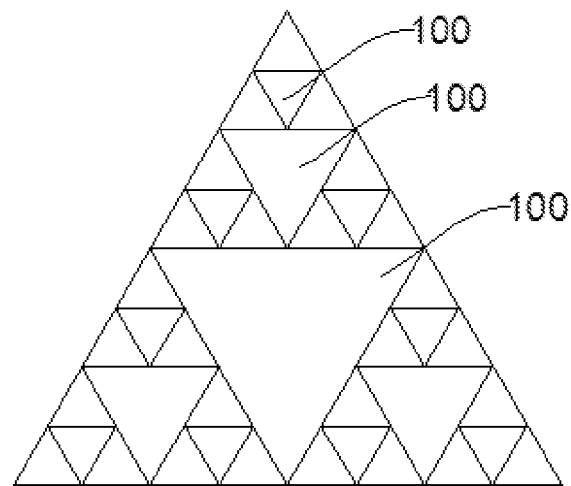
FIG. 20 is a diagram illustrating the structure of an implementation of embodiment nine of the present application.

As shown in FIGS. 19 and 20, the lighting device is generally triangular in shape and is formed by a fractal design of several triangular OLED lamp panels 100 of different sizes. Each OLED lamp panel is designed using a scheme similar to that described in the preceding embodiments.

In some embodiments of the present application, the lighting device is an OLED vehicle lamp.

Embodiment Ten

This embodiment provides a lighting device including at least one OLED lamp panel 100 described in the proceeding embodiments and a reflective structure 20.

A light-emitting cavity 30 is formed between the reflective structure 20 and the OLED lamp panel. The reflective structure 20 has at least two reflective mirrors 21 located in the light-emitting cavity 30.

Figure 21:
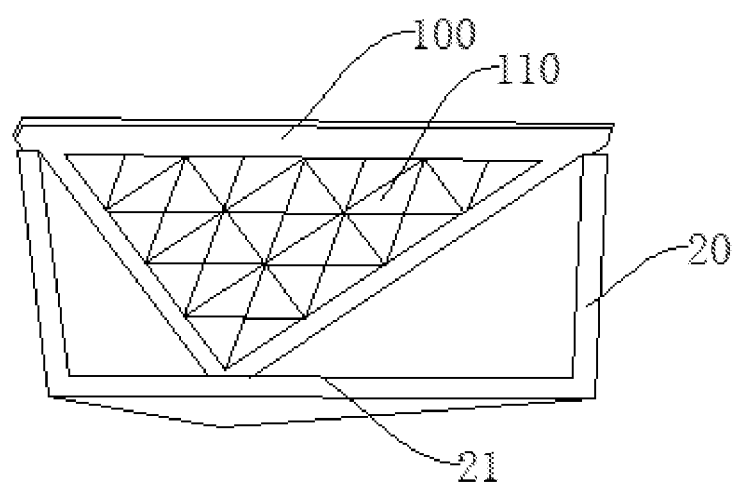
FIG. 21 is a diagram illustrating the structure of a lighting device in embodiment ten of the present application.
Figure 22:
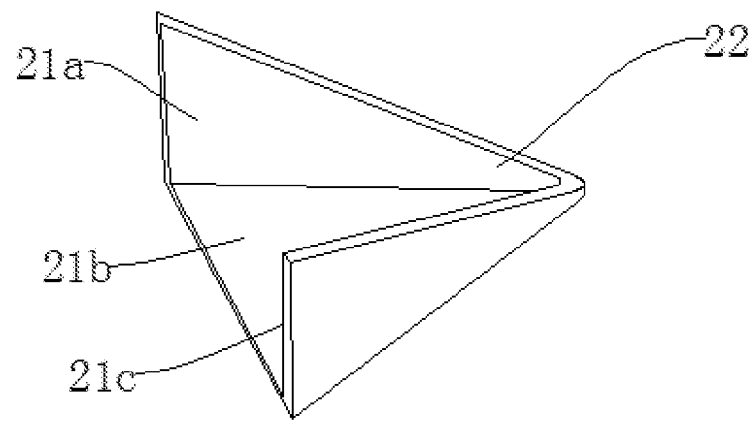
FIG. 22 is a diagram illustrating the structure of a reflective structure in embodiment ten of the present application.
Figure 23:
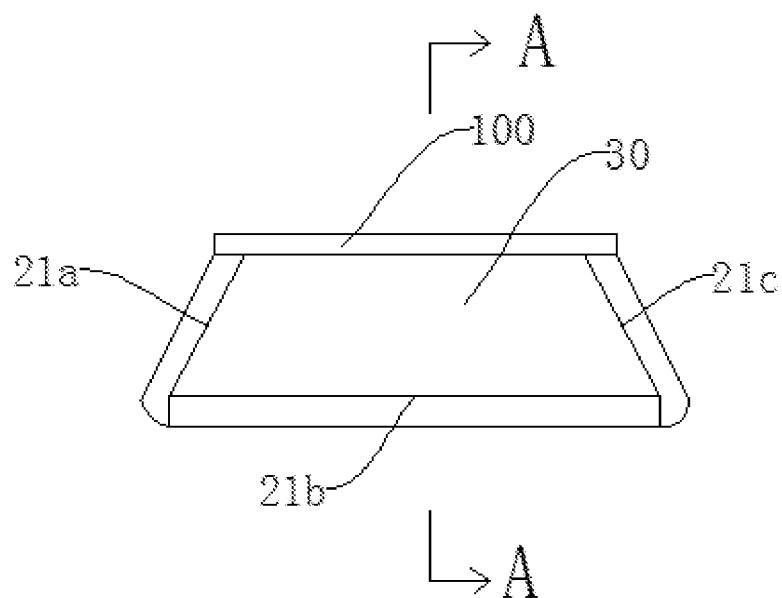
FIG. 23 is a diagram illustrating the sectional structure of a light outlet of the lighting device of FIG. 21.

In this embodiment, the number of the OLED lamp panel 100 is one as shown in FIG. 21. The reflective structure 20 is similar to a quadrangular pyramid structure and is made of a polycarbonate (PC) material. One side of the reflective structure 20 is provided with an opening 22, and the OLED lamp panel 100 is mounted corresponding to the opening 22. In a process of actual assembly, the opening may be downward, that is, the OLED lamp panel 100 is located below the reflective structure 20; or the opening may be located upward, that is, the OLED lamp panel 100 is located above the reflective structure. As shown in FIGS. 22 and 23, the reflective structure 20 is formed to have a cross-sectional surface similar to a U shape. A first reflective mirror 21a of the reflective structure 20 is disposed on a side of the reflective structure 20 adjacent to the OLED lamp panel 100, and the reflective structure 20 is also provided with the second reflective mirror 21b and the third reflective mirror 21c. Therefore, those skilled in the art can understand that in the embodiments of the present application, the first reflective mirror 21a, the second reflective mirror 21b, and the third reflective mirror 21c are all disposed on one integral reflective structure 20. In other embodiments, the reflective mirrors may be disposed on different reflective structures. For example, the reflective structure is composed of three separate reflective plates. The first reflective mirror 21a, the second reflective mirror 21b, and the third reflective mirror 21c are disposed on three separate reflective plates, respectively.

In other embodiments, the number of OLED lamp panels 100 may also be two or three. The number of reflective structures 20 may also be three or more.

The preceding are only structural diagrams of some embodiments of the lighting device. Those skilled in the art can understand that as long as the number of OLED lamp panels 100 is greater than or equal to 1 and the number of reflective mirrors 21 in the reflective structure 20 is greater than or equal to 2, the corresponding content is within the protection scope of the present application.

In this embodiment, at least two reflective mirrors 21 and at least one OLED lamp panel 100 are provided so that the display region 110 of the OLED lamp panel 100 and the reflective mirrors 21 form the light-emitting cavity 30. The light output intensity is increased by multiple reflections of light from the OLED lamp panel 100.

In this embodiment, the reflectivity of the reflective mirrors 21 is greater than or equal to 80%, preferably greater than or equal to 95%. The reflective mirrors 21 may be formed in any of the following manners.

Manner one: The material of the reflective structure 20 may be, for example, the PC. The reflective mirrors 21 may form a mirror image effect by performing an electroplating process or physical vapor deposition (PVD) on the PC material. The electroplating material may be, for example, nickel and/or nickel-chromium alloys; alternatively, the electroplating material may also include other materials such as aluminum or silver on the basis of nickel and/or nickel-chromium alloys.

Manner two: The base material of the reflective structure 20 is not limited. The reflective mirrors 21 may be formed by attaching a high-reflectivity metal film to the base surface of the reflective structure 20. The material of the metal film may be silver-aluminum.

No matter in any of the above manners, the high refractive index may further ensure the light output intensity of the lighting device.

Figure 24:
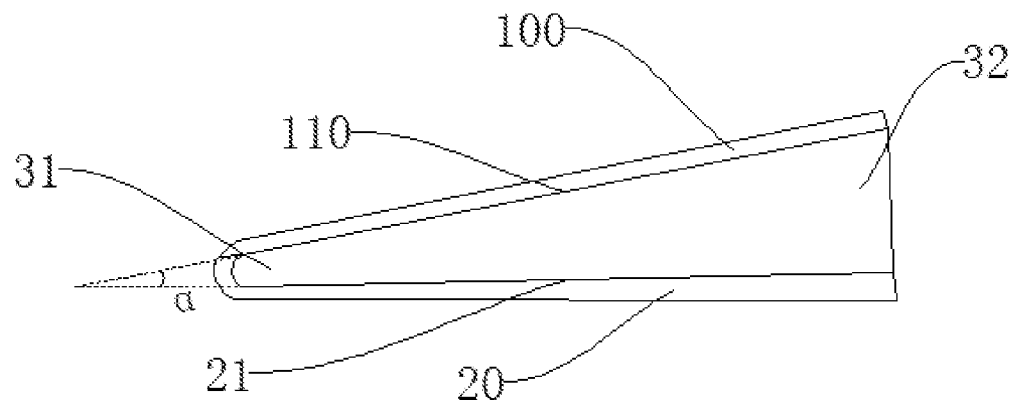
FIG. 24 is a diagram illustrating a sectional view structure taken along A-A of FIG. 23.

In this embodiment, as shown in FIG. 24, the light-emitting cavity 30 has a first end 31 and a second end 32 opposite to the first end 31. The aperture of the light-emitting cavity is gradually enlarged from the first end to the second end, and a light outlet is formed at the second end.

The aperture of the light-emitting cavity 30 is designed such that the light output of the light-emitting cavity 30 has a deep, stereoscopic and technological feel. The light-emitting cavity 30 is designed such that the entire light-emitting cavity 30 may be formed into a shape such as an engine nozzle, a vector transmitter, a spitfire, a horn, a magic box, and a sound. The shapes are rich and beautiful.

Based on the design in which the aperture of the light-emitting cavity 30 is gradually enlarged, the display region 110 is a planar region. As shown in FIG. 24, a first angle α is between the reflective mirror 21 and the display region 110, and the first angle α is an acute angle. In an embodiment, the first angle α ranges from 10° to 75°. This range of the first angle α not only satisfies the space requirement of a narrow strip shape of the lighting device, but also ensures the luminous effect.

In this embodiment, the reflective mirror 21 is a plane. In other embodiments, the reflective mirror 21 may also be configured as a curved surface, for example, each reflective mirror 21 may be a corrugated curved surface; or an outer convex surface to create the effect of a convex lens; or an inner concave surface; or a partial plane and/or a partially curved surface and/or a partial convex surface and/or an inner concave surface. The light reflectivity of each reflective mirror 21 is further increased by using the surface shapes of the preceding, thereby further improving the luminous intensity of the lighting device.

In some embodiments of the present application, the reflective mirror 21 is provided with a raised prism structure capable of further increasing the reflectivity of the reflective mirror 21. In the light-emitting cavity, the reflective effect of each raised prism is stronger than that of other parts. The raised prism is shining and prominent like diamonds, thus creating a luminous effect similar to diamonds.

In this embodiment, the reflective structure 20 and the OLED lamp panel 100 may be integrally and fixedly connected, or separately arranged, which is described as follows.

For example, the OLED lamp panel 100 is correspondingly and fixedly connected to the edge of the reflective structure 20. For example, the non-light-emitting side of the OLED lamp panel 100 faces away from the reflective structure 20. The OLED lamp panel 100 is installed at the opening 22 of the reflective structure 20. The OLED lamp panel 100 is in contact with the reflective structure 20. In this manner, the reflective structure 20 may support the OLED lamp panel 100. The edge where the reflective structure 20 is in contact with the OLED lamp panel 100 is flanged, and the OLED lamp panel 100 is fixedly connected to the flange of the reflective structure by means of a buckle, a snap fit, a screw, an adhesive, a hot riveting, or the like. At this time, the light-emitting cavity 30 forms a closed space on the longitudinal section. The end of the light-emitting cavity 30 at which the aperture is relatively smaller may be completely closed or may have a certain opening.

For example, the OLED lamp panel 100 is suspended on the reflective structure 20. The OLED lamp panel 100 is fixed to the lamp housing of the lighting device or the decorative strip of the lighting device by means of a bracket. The OLED lamp panel 100 is fixed to the bracket by means of a buckle, a snap fit, a screw, an adhesive, a hot riveting, or the like. Then the bracket is fixed to the decorative strip or the housing of the lighting device. At this time, the light-emitting cavity 30 forms a semi-closed space with a gap on the longitudinal section. The end of the light-emitting cavity 30 at which the aperture is relatively smaller may be completely closed or may have a certain opening.

When the structure of the lighting device in this embodiment is matched with the structure of the OLED lamp panel of the present application, and in particular when the OLED lamp panel is provided with multiple independent light-emitting units, different lighting device effects can be achieved by the control of turning-on degrees of different light-emitting units. These lighting device effects present groups of lighting device effects after reflection by the reflective mirrors 21, which not only improves the light intensity, but also further achieves the stereoscopic perception of the lighting device.

Embodiment Eleven

On the basis of embodiment ten, the display region 110 is a planar region and has a light output direction perpendicular to the surface of the display region. The light projection area ratio of the display region 110 on any one of the reflective mirrors in the light output direction of the display region 110 is greater than or equal to 70%. The light projection area ratio is a proportion of the area of a light projection region of the display region 110 on the reflective mirror in the light output direction of the display region 110 to the area of the display region 110.

For the lighting device, the light output rate is equal to the ratio of the light output from the light outlet to the original light output of the OLED lamp panel. The larger the ratio is, the higher the light intensity under the same conditions is. The present application limits the light projection area ratio to be greater than or equal to 70% so that a large proportion of the primary light source is projected on the front-facing reflective mirror, increasing the light output of the light outlet and improving the light output ratio of the lighting device, thereby increasing the light intensity of the lighting device.

Figure 25:
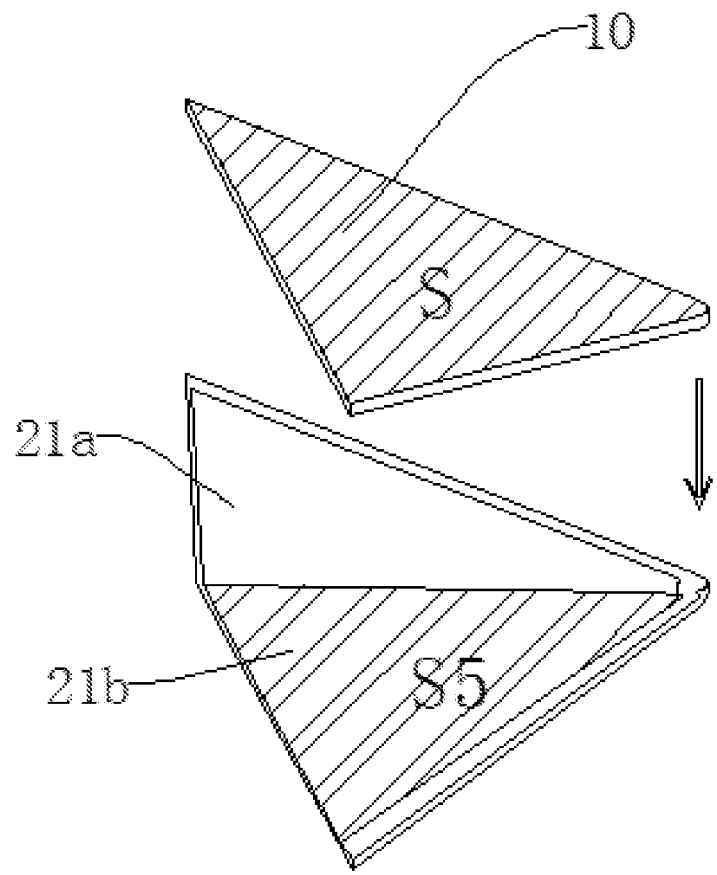
FIG. 25 is a diagram illustrating the structure of description of the area of a light-transmitting region of a lighting device in FIG. 23 corresponding to embodiment eleven of the present application.

For example, FIG. 25 corresponds to the situation of the reflective structure 20 in FIG. 23. The reflective mirror 21 includes the first reflective mirror surface 21a, the second reflective mirror 21b, and the third reflective mirror 21c. The angle between the first reflective mirror 21a and the second reflective mirror 21b is less than or equal to 90°. The angle between the second reflective mirror 21b and the third reflective mirror 21c is less than or equal to 90°, so that light of the display region 110 on the two sides of the first direction (the arrow direction in FIG. 25) may project on the second reflective mirror 21b. The total area of the display region 110 of the OLED lamp panel 100 is S. The light projection area of the display region on the second reflective mirror 21b is S5. The light projection area ratio S5/S is greater than or equal to 70%. In this embodiment, the light projection area ratio is 100%. In the figures, for ease of viewing, the part of the reflective structure 20 where the third reflective mirror 21c is located is removed.

Figure 26:
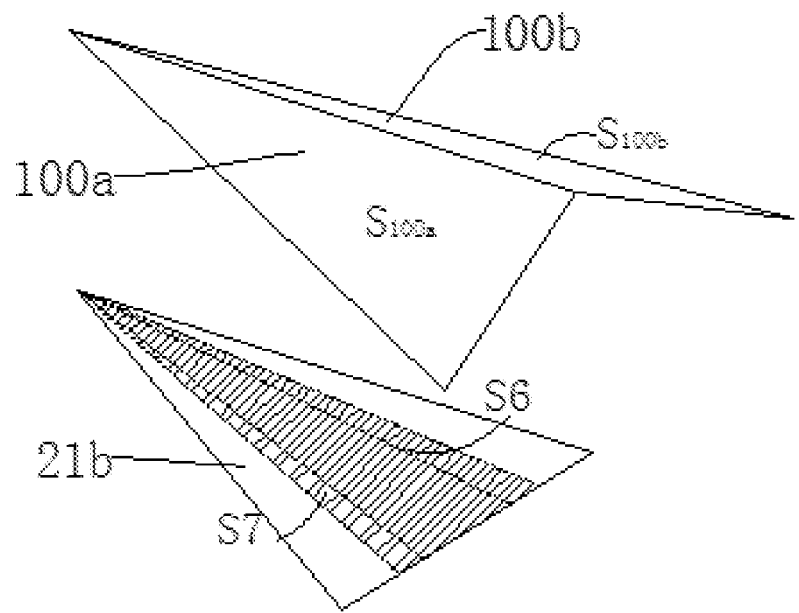
FIG. 26 is a diagram illustrating the structure of description of the area of a light-transmitting region of a second lighting device in embodiment eleven of the present application.

As shown in FIG. 26, two OLED lamp panels are provided, which are a first OLED lamp panel 100a and a second OLED lamp panel 100b, respectively. The area of the display region of the first OLED lamp panel 100a is $S_{100a}$. The area of the display region of the second OLED lamp panel 100b is $S_{100b}$. The light projection area of the display region of the first OLED lamp panel 100a on the second reflective mirror 21b is S6. The light projection area of the display region of the second OLED lamp panel 100b on the second reflective mirror 21b is S7. The light projection area ratio S6/S ma of the first OLED lamp panel 100a is equal to 85%. The light projection area ratio S7/S100b of the second OLED lamp panel 10b is equal to 85%. For ease of explanation, the first reflective mirror 21a and the third reflective mirror 21c are illustrated by default in FIG. 26.

When the OLED lamp panel 100 achieves a large proportion of the light projection area ratio on one of the reflective mirrors, the primary light source of the OLED lamp panel 100 is highly efficiently reflected, and when the reflectivity of the reflective mirror is more than 80%, the light intensity of the lighting device can be further effectively increased.

Embodiment Twelve

Figure 27:
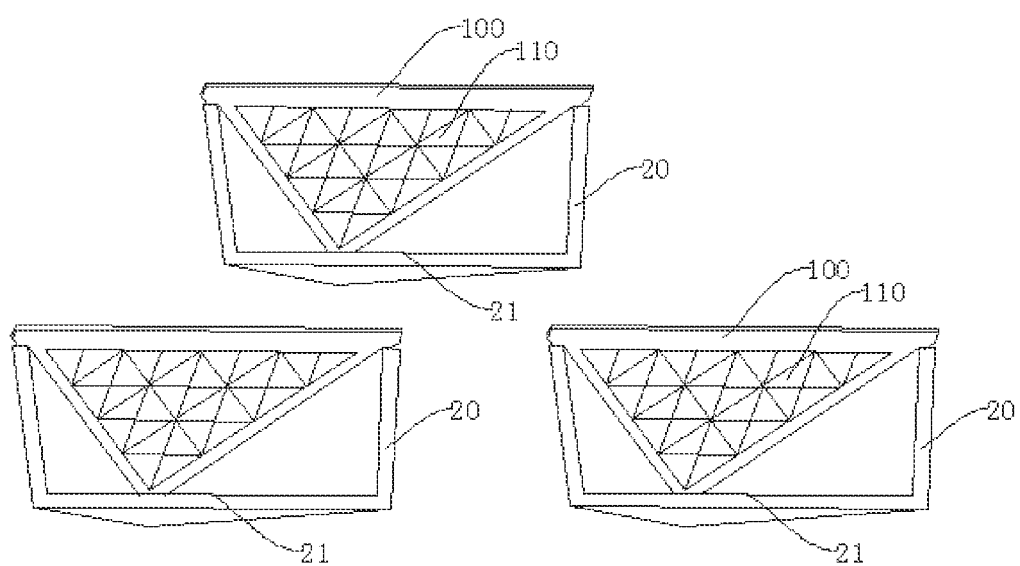
FIG. 27 is a diagram illustrating the structure of a lighting device in embodiment twelve of the present application.

As shown in FIG. 27, this embodiment provides a vehicle lamp. The vehicle lamp is provided with two or more lighting devices described in embodiment ten or embodiment eleven. In an embodiment, when the number of the lighting devices is greater than or equal to three, the lighting devices are arranged according to a set rule to form an integral lamp pattern. The setting rule is, for example, linear arrangement, curvilinear arrangement, or circumferential arrangement.

The preceding description is illustrative of alternative embodiments of the present application and the technical principles used therein. Those of ordinary skill in the art should understand that the scope referred to in the application is not limited to the technical schemes formed by the particular combinations of the preceding technical features, but intended to cover other technical solutions which may be formed by any combination of the preceding technical features or their equivalents without departing from the concept of the application. For example, technical schemes formed by mutual substitutions of the preceding features and the technical features disclosed in the present application but not limited to that have similar functions.

What is claimed is:

1. A lighting device, comprising:
   at least one organic light-emitting diode (OLED) lamp panel; and
   a reflective structure, wherein a light-emitting cavity is formed between the reflective structure and the OLED lamp panel, and the reflective structure has at least two reflective mirrors located in the light-emitting cavity;
   wherein a display region of the at least one OLED lamp panel comprises:
   at least one main display region, which is formed by splicing a plurality of main light-emitting units of a same shape; and
   a display peripheral region consisting of a peripheral region I and a peripheral region II, wherein the peripheral region I is formed by a plurality of first peripheral light-emitting units, and the peripheral region II is formed by a plurality of second peripheral light-emitting units;
   wherein a shape of each of the plurality of first peripheral light-emitting units is an n-sided polygon, wherein n≥3;
   the plurality of first peripheral light-emitting units or the plurality of second peripheral light-emitting units are of the same shape as the plurality of main light-emitting units.

2. The lighting device according to claim 1, wherein the display region is a planar region and has a light output direction perpendicular to a surface of the display region; and for one reflective mirror of the at least two reflective mirrors, a light projection area ratio of the display region on the one reflective mirror in the light output direction of the display region is greater than or equal to 70%, wherein the light projection area ratio is a proportion of an area of a light projection region of the display region on the one reflective mirror in the light output direction of the display region to an area of the display region.

3. The lighting device according to claim 1, wherein a distance between adjacent light-emitting units in the display region is $D_{adjacent}$, and $D_{adjacent} < D_{distinguishable}$, wherein $D_{distinguishable}$ denotes a distance distinguishable by human eyes and satisfies the following formulas:

$$D_{distinguishable} = 2*L*\mathrm{Sin}[(\Theta/2)*57.3];$$

$$\Theta = 1.22*\lambda/2*n*R,$$

wherein L denotes a minimum distance between a person and a vehicle, λ denotes a main light-emitting wavelength of a main light-emitting unit of the plurality of main light-emitting units, n denotes a refractive index of a human eye pupil, and R denotes a set radius of the human eye pupil.

4. The lighting device according to claim 3, wherein at least one of a side length of a main light-emitting unit of the plurality of main light-emitting units or a side length of a first peripheral light-emitting unit of the plurality of first peripheral light-emitting units is greater than or equal to $5*D_{distinguishable}$.

5. The lighting device according to claim 1, wherein a shape of a main light-emitting unit of the plurality of main light-emitting units is an n-sided polygon or a graph formed by cutting an n-sided polygon; the main light-emitting unit is formed of any one kind of polygonal pixels or non-polygonal pixels or a combination of two or more kinds of polygonal pixels or non-polygonal pixels; and the main light-emitting unit is composed of at least three adjacent pixels, and driving voltages of the at least three adjacent pixels in the main light-emitting unit are completely different or partially different so that the main light-emitting unit forms a solid lighting pattern.

6. The lighting device according to claim 5, wherein at least one of a corner of the main light-emitting unit or a corner of the second peripheral light-emitting unit is rounded, and a ratio of an area removed by a rounded corner to an area of a light-emitting unit after the rounded corner is formed is less than or equal to 0.25.

7. The lighting device according to claim 1, wherein shapes of the plurality of second peripheral light-emitting units comprise at least one of an n-sided polygon or a graph formed by cutting an n-sided polygon.

8. The lighting device according to claim 7, wherein at least one of a corner of the main light-emitting unit or a corner of the second peripheral light-emitting unit is rounded, and a ratio of an area removed by a rounded corner to an area of a light-emitting unit after the rounded corner is formed is less than or equal to 0.25.

9. The lighting device according to claim 1, wherein a fractal pattern is formed between the main display region and a main light-emitting unit of the plurality of main light-emitting units.

10. The lighting device according to claim 1, wherein a ratio of at least one of an area of a largest pixel in a second peripheral light-emitting unit of the plurality of second peripheral light-emitting units or an area of a largest pixel in a first peripheral light-emitting unit area of the plurality of first peripheral light-emitting units to an area of a largest pixel in a main light-emitting unit of the plurality of main light-emitting units ranges from 0.8 to 1.2.

11. The lighting device according to claim 1, wherein a ratio of an area of the peripheral region II to an area of the peripheral region I ranges from 0.8 to 1.2.

* * * * *